(12) United States Patent
Jang et al.

(10) Patent No.: US 7,842,385 B2
(45) Date of Patent: Nov. 30, 2010

(54) COATED NANO PARTICLE AND ELECTRONIC DEVICE USING THE SAME

(75) Inventors: Eun-joo Jang, Yuseong-gu (KR); Shin-ae Jun, Seongnam-si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 437 days.

(21) Appl. No.: 11/434,219

(22) Filed: May 16, 2006

(65) Prior Publication Data

US 2007/0087197 A1    Apr. 19, 2007

(30) Foreign Application Priority Data

May 16, 2005    (KR) .................. 10-2005-0040675

(51) Int. Cl.
- *B32B 5/16* (2006.01)
- *H01L 23/532* (2006.01)
- *H01L 21/06* (2006.01)
- *H01L 21/18* (2006.01)

(52) U.S. Cl. .............. 428/403; 257/103; 257/614; 257/616; 257/632; 257/635; 257/646; 257/788; 257/789; 257/790; 428/212; 428/328; 428/407; 428/689; 428/690; 428/697; 428/699

(58) Field of Classification Search ............. 428/403, 428/407, 212, 323, 328, 689, 690, 697, 699; 257/103, 614, 616, 632, 635, 646, 788, 789, 257/790

See application file for complete search history.

(56) References Cited

U.S. PATENT DOCUMENTS

| | | | |
|---|---|---|---|
| 6,207,280 B1 * | 3/2001 | Atarashi et al. ............. 428/403 |
| 6,501,091 B1 | 12/2002 | Bawendi et al. |
| 6,710,366 B1 * | 3/2004 | Lee et al. ..................... 257/14 |
| 6,726,992 B1 * | 4/2004 | Yadav et al. ................. 428/403 |
| 6,756,120 B2 * | 6/2004 | Smith et al. ................. 428/404 |
| 6,846,565 B2 * | 1/2005 | Korgel et al. ............... 428/402 |
| 6,918,946 B2 * | 7/2005 | Korgel et al. ................. 75/362 |
| 7,005,085 B2 * | 2/2006 | Hampden-Smith et al. .................. 252/301.4 R |
| 7,005,669 B1 * | 2/2006 | Lee ............................. 257/21 |
| 7,068,898 B2 * | 6/2006 | Buretea et al. .............. 385/123 |
| 7,081,295 B2 * | 7/2006 | James et al. ................. 428/327 |
| 7,083,490 B2 * | 8/2006 | Mueller et al. ................. 445/24 |
| 7,172,811 B2 * | 2/2007 | Denisyuk et al. ............. 428/402 |
| 7,332,211 B1 * | 2/2008 | Bulovic et al. .............. 428/206 |
| 7,611,750 B2 * | 11/2009 | Yi et al. ....................... 427/218 |
| 2004/0095658 A1 * | 5/2004 | Buretea et al. .............. 359/853 |
| 2005/0040376 A1 * | 2/2005 | James et al. ................. 252/583 |

\* cited by examiner

*Primary Examiner*—H. (Holly) T Le
(74) *Attorney, Agent, or Firm*—Cantor Colburn LLP

(57) ABSTRACT

A coated nano particle and an electronic device using the composite nano particle as an illuminator are provided. The composite nano particle includes a nano particle receiving light and emitting light; and a coating material formed on a surface of the nano particle and having an index of refraction different from that of the nano particle. The coated nano particle is made by coating a surface of the nano particle with a material having an index of refraction, which has an intermediate value between an index of refraction of a matrix and an index of refraction of the nano particle as an illuminator, with a predetermined thickness. The light emitted from the nano particle is efficiently transferred to the outside as the light reflected from the matrix and absorbed by the nano particle is suppressed. Therefore, a luminous efficiency of the illuminator is improved, and an electronic device using the illuminator is provided.

26 Claims, 5 Drawing Sheets

COATED NANO PARTICLE AND ELECTRONIC DEVICE USING THE SAME

CROSS-REFERENCE TO RELATED PATENT APPLICATION

This application claims the benefit of Korean Patent Application No. 10-2005-0040675, filed on May 16, 2005, in the Korean Intellectual Property Office, the disclosure of which is incorporated herein in its entirety by reference.

BACKGROUND OF THE DISCLOSURE

1. Field of the Disclosure

The present disclosure relates to a nano particle used as an illuminator in an electronic device, and more particularly, to a nano particle coated with a material having a lower index of refraction than that of the nano particle on the surface of the nano particle, for improving the luminous efficiency of the electronic device.

2. Description of the Related Art

Recently, many attempts have been made to employ a nano particle as an illuminator of an electronic device. Among the nano particles, a quantum dot (QD) as a compound semiconductor nano particle is being actively investigated.

The quantum dot is a semiconductor material having a nano size, and shows a quantum confinement effect. The quantum dot receives light from an excitation source, and if it reaches an energy excitation state, it emits energy as much as the energy band gap of the quantum dot. Thus, when the size of the quantum dot or the composition of the quantum dot is controlled, the corresponding energy band gap can be controlled so as to emit light having various wavelengths. Therefore, the quantum dot can be used as an illuminator of an electronic device.

U.S. Pat. No. 6,501,091 discloses a light emitting diode in which a quantum dot is scattered in a matrix and is used as an illuminator. In order to fabricate a light emitting diode, U.S. Pat. No. 6,501,091 discloses a method of forming polymer having dispersed quantum dots by mixing a replaced organic ligand, a monomer having a good affinity, and a small amount of catalyst with quantum dots coating the surface of the quantum dots, and applying heat.

Figure 1:
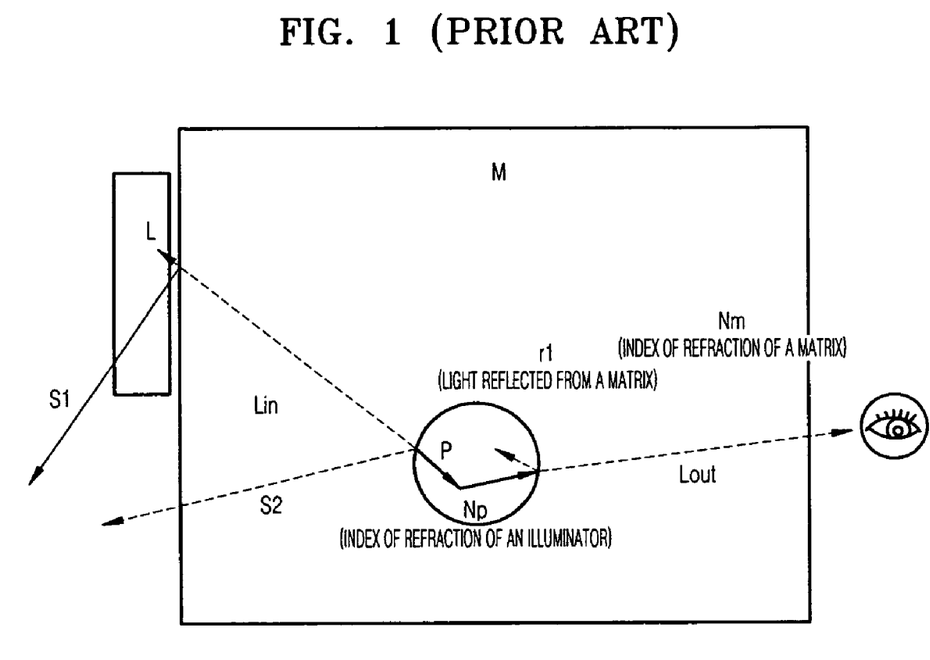
FIG. 1 is a schematic view illustrating that an illuminator absorbs light emitted from a light source, and emits light externally in accordance with the conventional technology.
Figure 2:
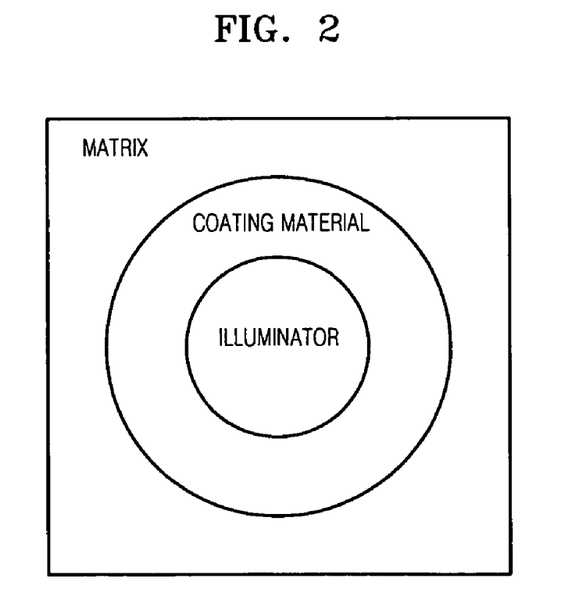
FIG. 2 is a schematic view illustrating that a coated nano particle fabricated according to an embodiment of the present invention which is dispersed in a matrix.

FIG. 1 illustrates a process in which an illuminator absorbs the light from a light source, and emits light to the outside.

The light transmitted through a matrix is partially reflected S2 at the interface between a nano particle and the matrix, and a remainder of the light is absorbed by the nano particle as an illuminator. The absorbed light changes the energy state of the nano particle to an excitation state, and changed light is emitted (Lout). When the light emitted from the nano particle is reflected due to the difference of indexes of refraction between the nano particle and the matrix, it may be reabsorbed by the illuminator and the luminous efficiency is decreased. That is, since light scattering occurs at the interface between the matrix and the illuminator due to the difference between an index of refraction of the matrix Nm and an index of refraction of the illuminator Np, the absorption efficiency of the optical energy is deteriorated, and the light emitted from the illuminator is reflected from the interface between the matrix and the illuminator, and is reabsorbed by the illuminator, thereby decreasing the luminous efficiency.

SUMMARY OF THE DISCLOSURE

The present invention may provide a coated nano particle and an electronic device including the coated nano particle for improving the luminous efficiency by minimizing lost light which is scattered or reabsorbed at an interface by coating the surface of a nano particle used as an illuminator with a material having a lower index of refraction than that of the nano particle.

According to an aspect of the present invention, there may be provided a coated nano particle comprising a nano particle receiving light and emitting light; and a coating material formed on a surface of the nano particle having an index of refraction lower than that of the nano particle.

The coating material may be formed on a surface of the nano particle with a multi-layered structure, and an index of refraction of a lower portion in the multi-layered structure may be greater than an index of refraction of an upper portion thereof.

Further, an index of refraction of the coating material may be lower than an index of refraction of the nano particle.

Further, the difference of indexes of refraction between the coating material and the nano particle may be 0.05 or more.

Further, the nano particle may be selected from a group II-VI compound, a group III-V compound, a group IV-VI compound, a group IV compound, or a mixture thereof.

Further, the group II-VI compound may be selected from the group consisting of two-element compounds comprising CdSe, CdTe, ZnS, ZnSe, ZnTe, ZnO, HgS, HgSe, and HgTe; three-element compounds comprising CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnTe, and HgZnSe; and four-element compounds such as CdZnSeS, CdZnSeTe, CdZnSTe, CdHgSeS, CdHgSeTe, CdHgSTe, HgZnSeS, HgZnSeTe, and HgZnSTe;

the group III-V compound is selected from the group consisting of a two-element compound comprising GaN, GaP, GaAs, GaSb, AlN, AlP, AlAs, AlSb, InN, InP, InAs, and InSb; a three-element compound comprising GaNP, GaNAs, GaNSb, GaPAs, GaPSb, AlNP, AlNAs, AlNSb, AlPAs, AlPSb, InNP, InNAs, InNSb, InPAs, InPSb, and GaAlNP; and a four-element compound comprising GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb;

the group IV-VI compound is selected from the group consisting of a two-element compound comprising SnS, SnSe, SnTe, PbS, PbSe, and PbTe; a three-element compound comprising SnSeS, SnSeTe, SnSTe, PbSeS, PbSeTe, PbSTe, SnPbS, SnPbSe, and SnPbTe; and a four-element compound comprising SnPbSSe, SnPbSeTe, and SnPbSTe; and the group IV compound is selected from the group consisting of a single element compound comprising Si and Ge; and a two-element compound comprising SiC and SiGe.

Further, the two-element compound, the three-element compound, or the four-element compound may exist inside a particle with a constant concentration, or may exist inside a same particle with divided into different states in concentration.

Further, the nano particle may be selected from the group consisting of inorganic fluorescent materials or a mixture thereof.

Further, the inorganic fluorescent material may be composed of at least one selected from the group consisting of $YBO_3:Ce^{3+},Tb^{3+}$; $BaMgAl_{10}O_{17}:Eu^{2+},Mn^{2+}$; $(Sr,Ca,Ba)(Al,Ga)_2S_4:Eu^{2+}$; $ZnS:Cu,Al$; $Ca_8Mg(SiO_4)_4Cl_2$: $Eu^{2+},Mn^{2+}$; $Ba_2SiO_4: Eu^{2+}$; $(Ba,Sr)_2SiO_4:Eu^{2+}$; $Ba_2(Mg, Zn)Si_2O_7:Eu^{2+}$; $(Ba,Sr)Al_2O_4$: $Eu^{2+}$; $Sr_2Si_3O_8.2SrCl_2:Eu^{2+}$; $(Sr,Mg,Ca)_{10}(PO_4)_6Cl_2:Eu^{2+}$; $BaMgAl_{10}O_{17}:Eu^{2+}$; $BaMg_2Al_{16}O_{27}:Eu^{2+}$; $Sr,Ca,Ba,Mg)P_2O_7:Eu^{2+},Mn^{2+}$; $(CaLa_2S_4:Ce^{3+}$; $SrY_2S_4$:

Eu$^{2+}$; (Ca,Sr)S: Eu$^{2+}$; SrS:Eu$^{2+}$; Y$_2$O$_3$: Eu$^{3+}$,Bi$^{3+}$; YVO$_4$: Eu$^{3+}$,Bi$^{3+}$;Y$_2$O$_2$S:Eu$^{3+}$,Bi$^{3+}$; and Y$_2$O$_2$S:Eu$^{3+}$.

Further, the coating material may be selected from the group consisting of SiO$_2$, TiO$_2$, SnO$_2$, ZnO, ZnS, In$_2$O$_3$—SnO$_2$, and Al$_2$O$_3$, or a mixture thereof.

Further, the light which the nano particle emits may have a wavelength of approximately 400 to 2400 nm.

According to another aspect of the present invention, there is provided an electronic device using a coated nano particle as an illuminator, and the coated nano particle comprises a nano particle for receiving light and emitting light; and a coating material formed on a surface of the nano particle having an index of refraction lower than that of the nano particle.

BRIEF DESCRIPTION OF THE DRAWINGS

The above and other features and advantages of the present invention will be described in detailed exemplary embodiments thereof with reference to the attached drawings in which.

DETAILED DESCRIPTION OF EXEMPLARY EMBODIMENTS

The present invention will now be described more fully hereinafter with reference to the accompanying drawings, in which exemplary embodiments of the invention are shown.

The present invention consists of a nano particle for absorbing and emitting light, and a nano particle coated with a material having a lower index of refraction than that of the nano particle.

Figure 3:
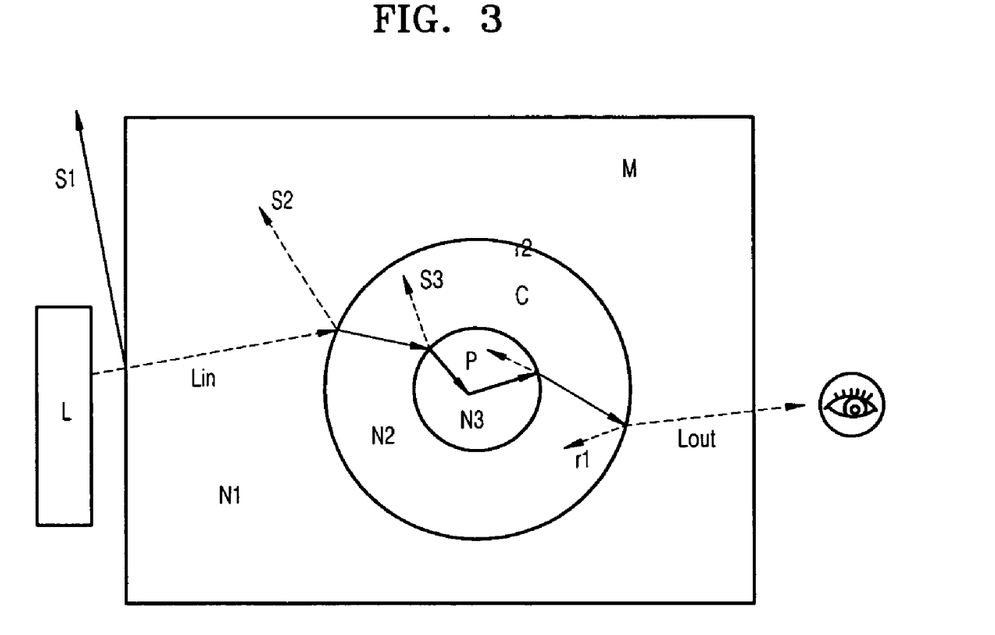
FIG. 3 is a schematic view illustrating that a coated nano particle which absorbs light emitted from a light source, and emits light externally according to an embodiment of the present invention.

FIG. 3 illustrates a process wherein a coated nano particle of the present invention absorbs light emitted from a light source, and emits light externally. The action of the coated nano particle of the present invention will be explained hereafter.

Referring to FIG. 3, the coated nano particle of the present invention is made by coating a nano particle P as an illuminator with a material C having a lower index of refraction than that of the nano particle P. When light Lin is emitted from a light source L, the light Lin is partially reflected S1 from the surface of a matrix M due to an index of refraction difference between air and the matrix M, and is lost. The light passing through the matrix M is partially scattered S2 at the interface with the coating material C due to an index of refraction difference between the matrix M and the coating material C.

The light passing through the coating material C is partially scattered S3 at the interface with the nano particle P due to an index of refraction difference between the coating material C and the nano particle P, and a remainder of the light is absorbed by the nano particle P. While the absorbed light undergoes an energy excitation process of the nano particle P, the energy of the nano particle P is converted, and thus, the light is emitted with a different wavelength. The emitted light is partially reflected at the interface due to an index of refraction difference between the nano particle P and the matrix M, and the reflected light is reabsorbed by the nano particle. The non-reflected light Lout can be observed from the outside, and finally, the efficiency of a light emitting device is determined.

The coated nano particle according to an embodiment of the present invention has a coating material C having a lower index of refraction than that of the nano particle on the surface of the nano particle. Thus, due to the difference between an index of refraction N1 of the matrix, which is significantly lower than that of the nano particle, and an index of refraction N3 of the nano particle, the amount of the light, which is scattered or reflected at the interface and reabsorbed, can be reduced. Further, the coating material provides effects for further stabilizing the surface of the nano particle thereby improving the luminous efficiency and the useful life.

In the present invention, the index of refraction of the coating material is preferably lower than that of the nano particle as an illuminator, and is preferably higher than that of the matrix.

The nano particle of the present invention may be used only if it can receive light from a light source and emit light. The nano particle is a compound semiconductor quantum dot and an inorganic fluorescent substance.

The quantum dot is selected from a group II-VI compound, a group III-V compound, a group IV-VI compound, a group IV compound, or a mixture thereof.

More particularly, the group II-VI compound is selected from two-element compound such as CdSe, CdTe, ZnS, ZnSe, ZnTe, ZnO, HgS, HgSe, HgTe, and the like; three-element compound such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnTe, HgZnSe, and the like; and four-element compound such as CdZnSeS, CdZnSeTe, CdZnSTe, CdHgSeS, CdHgSeTe, CdHgSTe, HgZnSeS, HgZnSeTe, HgZnSTe, and the like.

The group III-V compound is selected from a two-element compound such as GaN, GaP, GaAs, GaSb, AlN, AlP, AlAs, AlSb, InN, InP, InAs, InSb and the like; a three-element compound such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP and the like; and a four-element compound such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and the like.

The group IV-VI compound is selected from a two-element compound such as SnS, SnSe, SnTe, PbS, PbSe, PbTe, and the like; a three-element compound such as SnSeS, SnSeTe, SnSTe, PbSeS, PbSeTe, PbSTe, SnPbS, SnPbSe, SnPbTe, and the like; and a four-element compound such as SnPbSSe, SnPbSeTe, SnPbSTe, and the like.

The group IV compound is selected from a single element compound such as Si, Ge, and the like; or a two-element compound such as SiC, SiGe, and the like.

In the two-element compound, the three-element compound, or the four-element compound, the crystal structure may be partially divided so that the compound may exist in a same particle, or in an alloy type.

The inorganic fluorescent substance used in the present invention is at least one fluorescent material or a mixture thereof selected from the group consisting of $YBO_3:Ce^{3+}$, $Tb^{3+}$; $BaMgAl_{10}O_{17}:Eu^{2+},Mn^{2+}$; $(Sr,Ca,Ba)(Al,Ga)_2S_4$: $Eu^{2+}$; $ZnS:Cu,Al$; $Ca_8Mg(SiO_4)_4Cl_2$: $Eu^{2+}$, $Mn^{2+}$; $Ba_2SiO_4$: $Eu^{2+}$; $(Ba,Sr)_2SiO_4:Eu^{2+}$; $Ba_2(Mg, Zn)Si_2O_7:Eu^{2+}$; $(Ba,Sr)Al_2O_4$: $Eu^{2+}$; $Sr_2Si_3O_8.2SrCl_2:Eu^{2+}$; $(Sr,Mg,Ca)_{10}(PO_4)_6Cl_2:Eu^{2+}$; $BaMgAl_{10}O_{17}:Eu^{2+}$; $BaMg_2Al_{16}O_{27}:Eu^{2+}$; $(Sr,Ca,Ba,Mg)P_2O_7:Eu^{2+},Mn^{2+}$; $CaLa_2S_4:Ce^{3+}$; $SrY_2S_4$: $Eu^{2+}$; $(Ca,Sr)S$: $Eu^{2+}$; $SrS:Eu^{2+}$; $Y_2O_3$: $Eu^{3+}$, $Bi^{3+}$; $YVO_4$: $Eu^{3+},Bi^{3+}$; $Y_2O_2S:Eu^{3+},Bi^{3+}$; $Y_2O_2S:Eu^{3+}$, and the like.

The difference between an index of refraction of the coating material of the composite nano particle of the present invention, and an index of refraction of the nano particle may be 0 or more theoretically, and is preferably 0.05 or more, and more preferably, may be in a range of 0.05 to 2.

The coating material may be selected from the group consisting of $SiO_2$, $TiO_2$, $SnO_2$, $ZnO$, $ZnS$, $In_2O_3$—$SnO_2$, $Al_2O_3$, SiC, AlN, or a mixture thereof.

A thickness of the coating material of the present invention is not particularly limited, but is preferably in a range of approximately 1 to 10 nm.

Further, the coating material of the composite nano particle of the present invention may have a layer structure, which is composed of materials from among the compositions listed above, and may have a multi-layered structure, which is composed of a plurality of laminated layers. In the multi-layered coating material structure, the coating material disposed at the outermost layer must have the lowest index of refraction, and a higher index of refraction may used for a material further inwardly.

As above, when the composite nano particle is made to have a multi-layered coating material having various index of refraction, a difference of the indexes of refraction between one material and other material contacting at the interface is reduced, and scattering of light at the interface can be effectively prevented.

The matrix, in which the composite nano particle of the present invention is dispersed, may be formed using a material suitable to the characteristics of a light emitting device, and may have a lower index of refraction than that of the coating material. A difference of the indexes of refraction between the matrix and the coating material is 0 or higher theoretically, and is preferably 0.05 or higher.

The matrix of the present invention may be selected from the group consisting of epoxy, silicon, acrylate polymer, glass, carbonate polymer, and a mixture thereof.

As a method of coating the surface of the composite nano particle, there are a crystal growth method of crystallizing while maintaining a crystal surface, a surface initiation polymerization method of replacing the surface of the nano particle with precursor of a coating material and compounding by a polymerization process, an amorphous coating method, and the like. A method of forming the nano particle of the present invention will be described in detail with an exemplary embodiment.

The nano particle of the present invention may be formed using a chemical wet composition method among typical quantum dot fabrication methods. In order to form a quantum dot in a nano size using a chemical wet composition method, an appropriate solvent is prepared with surfactant mixed therein by controlling the components and concentrations under an atmosphere of an inert gas such as nitrogen gas or argon gas, and the reaction temperature is maintained to grow a crystal structure. Thereafter, the precursor material for a quantum dot is placed in the mixed reaction solution, and a reaction time is maintained to control the size of the quantum dot. After completing the reaction, and decreasing the temperature, the quantum dot is separated from the solution.

The solvent used in the embodiment of the present invention may be an alkyl phosphine having approximately 6 to 22 carbon atoms, alkyl phosphine oxide having approximately 6 to 22 carbon atoms, alkyl amine having approximately 6 to 22 carbon atoms, alkanes having 6 to 22 carbon atoms, alkenes having approximately 6 to 22 carbon atoms, or a mixture thereof. The temperature of a reaction for expeditious crystal growth and solvent stability is preferably in a range of 100 to 400° C., and more preferably, 180 to 360° C. The reaction time is preferably 1 second to 4 hours, and more preferably, 10 seconds to 3 hours.

In the meantime, since the quantum dot formed by the chemical wet composition method is dispersed inside the solution in colloidal state, the quantum dot is separated from the solvent by centrifugation, and the quantum dot separated as above is mixed with ethanol as non-solvent. After centrifugation, a precipitate is dispersed into a solvent provided with an active base, and after agitating, the active base of the quantum dot is replaced.

A precursor of a coating material is put into the quantum dot formed as above and having a replaced active base, and the mixture is agitated for a predetermined time so that a coating layer is formed on a surface of the quantum dot.

The active base used in the present invention may be pyridine, 3-mercaptopropylalcohol, 3-mercaptopropylsilane, 3-aminopropylsilane, and the like. Further, the precursor of the coating material used in the present invention may be triethoxy silane, trimethoxy silane, tributhoxy silane, sodium silicate, titanium isopropoxide, titanium butoxide, tin butoxide, sodium stannate, and the like.

Figure 4A:
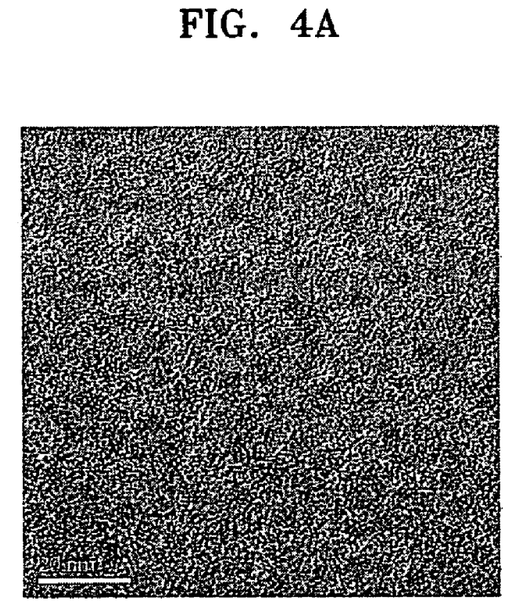
FIG. 4A is a TEM photograph illustrating the state of the nano particles before coating.
Figure 4B:
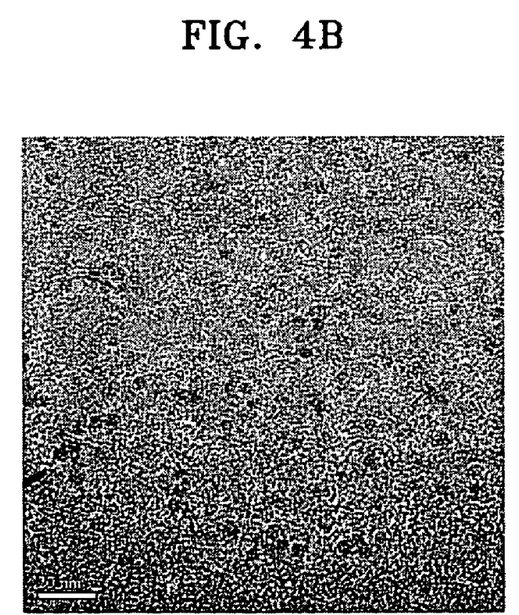
FIG. 4B is a TEM photograph illustrating the state of the nano particles when coated with silica.

FIG. 4B illustrates a structure of the composite nano particle formed by the method described above according to an embodiment of the present invention. FIG. 4B is a TEM photograph of a structure of the nano particle coated with silica. As illustrated in FIG. 4B, the nano particle coated by the present invention has an amorphous thin film around the particle. However, a structure of the nano particle, which is not coated, illustrated in FIG. 4A has only a crystal structure without an amorphous structure.

Figure 6:
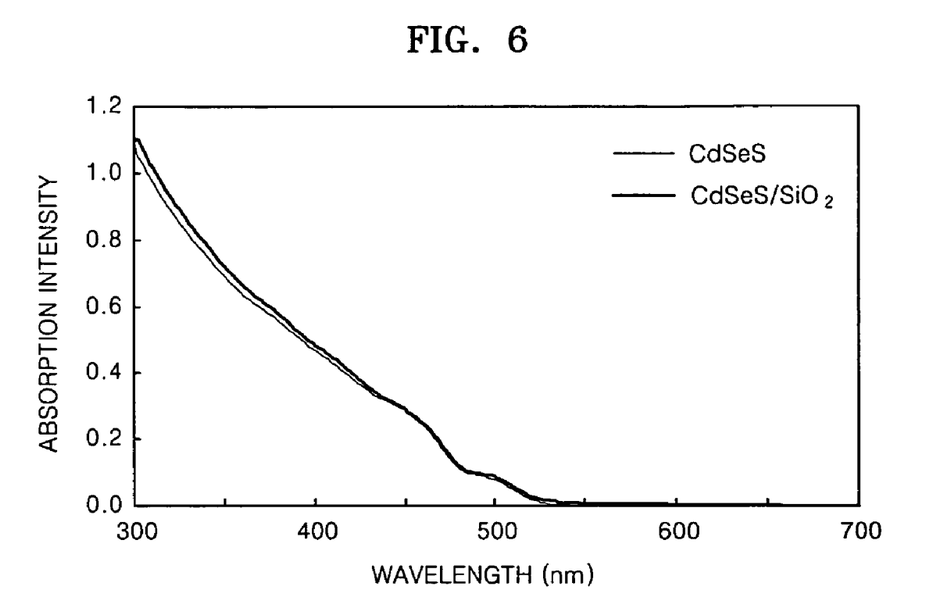
FIG. 6 is a light absorbing spectrum of a nano particle before and after coating.
Figure 7:
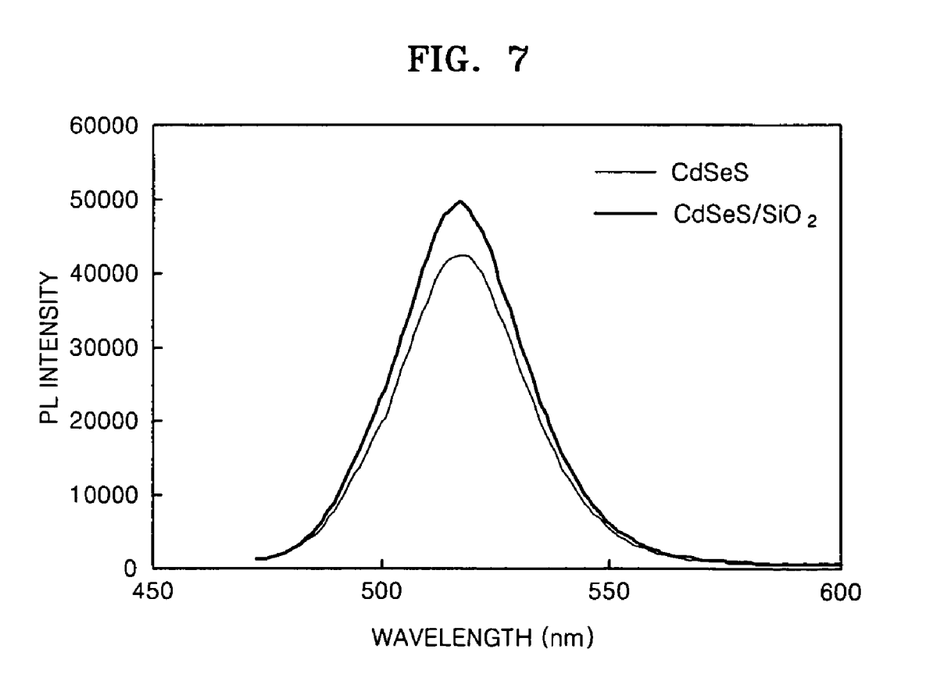
FIG. 7 is a light excitation emitting spectrum of a nano particle before and after coating.

FIGS. 6 and 7 illustrate UV absorbing spectrum and optical excitation emitting spectrum of a CdSeS nano particle and a CdSeS/SiO$_2$ nano particle coated with silica respectively.

In the same conditions of absorbing wavelength and an absorption intensity of the CdSeS nano particle and the CdSeS/SiO$_2$ composite nano particle of the present invention as illustrated in FIG. 6, a PL intensity of the CdSeS/SiO$_2$ composite nano particle of the present invention is increased by about 1.2 times compared to a PL intensity of the CdSeS nano particle as illustrated in FIG. 7. This can be explained by a loss of luminous efficiency occurring due to a significant difference between the 2.4 index of refraction of the CdSeS material and the 1.4 index of refraction of butanol solvent reduced by the presence of SiO$_2$ having 1.5 index of refraction, which is interposed between them.

As described above, the present invention provides a nano particle for receiving and emitting light, a nano particle coated with a material having a lower index of refraction than that of the nano particle, a matrix dispersing the coated nano particle, and an electronic device including a light source.

The electronic device of the present invention encompasses all kinds of electronic devices using an illuminator. Such an electronic device may be a light emitting diode, a laser diode, an LCD, a PDP, and the like.

As one example of the electronic device of the present invention, a light emitting diode may consist of a composite nano particle, a matrix dispersing the composite nano particle, a molding resin covering the matrix, and a light source.

The matrix dispersing the composite nano particle of the present invention may comprise a material, which mostly does not absorb a wavelength range of the light emitted from a light source of the device, and may have a lower index of refraction of that of the coating material. The difference of the indexes of refraction between the matrix and the coating material may be 0 or more theoretically, and preferably, is 0.05 or more. The matrix of the present invention utilize a material selected from the group consisting of epoxy, silicon, acrylate polymer, glass, carbonate polymer, and a mixture thereof.

A wavelength of light of the light source used in the present invention must be a wavelength in a range allowing the nano particle to emit light, and for an example, may be in the range of approximately 400 to 2400 nm, and the composite nano particle of the present invention receiving the light in the range to emit light in a wavelength of approximately 400 to 2500 nm.

Further, in order to fabricate an electronic device of the present invention as described above, a first dispensing process and a hardening process are performed by dispersing the composite nano particle of the present invention into the matrix, dispensing the matrix on a chip of a device in which a light source emits, and hardening using an oven at a temperature of 120° C. Thus, in order to make the resultant structure, which is first dispensed and hardened, in a lamp shape, molding resin is put into a frame for molding, and the chip passing the first dispensing and hardening processes is put into the molding resin. A hardening process is again performed, and then, the frame is taken out of an oven. Finally, when the frame is separated, a light emitting diode in a lamp shape having the quantum dot fluorescent material as an illuminator is fabricated.

Hereinafter, the present invention will be explained with exemplary embodiments in more detail. The following embodiments are intended to explain in an exemplary manner the object of the present invention, and the present invention is not limited to the embodiments.

Embodiment 1

CdSeS Nano Particle Compound with Pyridine Replaced 16 g of trioctylamine (TOA), 0.5 g of oleic acid, and 0.4 mmol of cadmium oxide are put into a 125 ml flask having a reflux condenser, and are agitated while controlling a reaction temperature at 300° C. In the meantime, Se powder is dissolved in trioctylphosphine (TOP) so as to make a Se-TOP complex solution having a Se concentration of about 0.25 M. S powder is dissolved in TOP so as to make a S-TOP complex solution having a S concentration of about 1.0 M. 0.9 ml of the S-TOP complex solution and 0.1 ml of the Se-TOP complex solution are quickly injected into the reaction mixture including cadmium, and are agitated for 4 minutes. When the reaction is completed, after decreasing a temperature of the reaction mixture rapidly if possible, and adding ethanol as non-solvent, centrifugation is performed. An upper portion of the solution lacking the centrifugal precipitate is withdrawn, and the precipitate is dispersed to toluene to form an about 1 wt % of solution.

After ethanol as non-solvent is added to the toluene solution of the CdSeS nano crystal fabricated above, centrifugation is performed, and the precipitate is dispersed to pyridine, and is agitated for about 30 minutes. After agitating, hexane as non-solvent is added, and centrifugation is performed. Thereafter, the precipitate is dispersed to butanol (1.4 of index of refraction) to form an about 1 wt % of solution.

A light absorbing spectrum and a light excitation emitting spectrum of the CdSeS solution dispersed in butanol are illustrated in FIGS. 6 and 7 respectively.

Embodiment 2

CdSeS Nano Crystal Coated with $SiO_2$ and with Pyridine Replaced

Ethanol as non-solvent is added to the toluene solution of the CdSeS nano particle fabricated in the Embodiment 1, and centrifugation is performed. An upper portion of the solution except for the centrifugal precipitate is drawn, and the precipitate is dispersed to pyridine and is agitated for about 30 minutes. After agitating, hexane as non-solvent is added and centrifugation is performed. The centrifugal precipitate is dispersed to pyridine again, and 0.1 ml of triethoxy silane (TEOS) is added, and is agitated for about 3 hours at a room temperature so as to form a $SiO_2$ layer on a surface of CdSeS. After agitating, hexane as non-solvent is added, and centrifugation is performed. Thereafter an upper portion of the solution lacking the centrifugal precipitate is withdrawn, and the precipitate is dispersed to butanol (1.4 of index of refraction) to form an about 1 wt % of solution. A light absorbing spectrum and a light excitation emitting spectrum of the scattered nano crystal solution are illustrated in FIGS. 6 and 7 respectively.

The CdSeS nano particle fabricated in the Embodiment 1 is illustrated in FIG. 4A, and the nano particle coated with silica fabricated in the Embodiment 2 is illustrated in FIG. 4B. An amorphous thin film is shown around the particle in the nano particle coated with silica of the Embodiment 2, but only the particle itself is observed in the nano particle non-coated with silica of the Embodiment 1.

Figure 5:
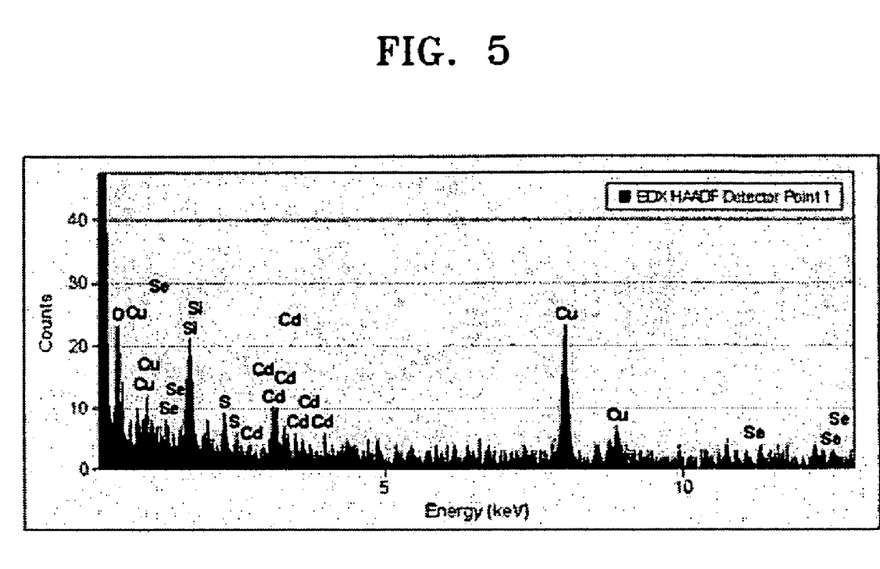
FIG. 5 illustrates the results of an EDS analysis illustrating components of nano particles coated with silica.

As a result of examining energy dispersive spectroscopy (EDS) to analyze the components of the coated nano particle of the Embodiment 2, Si and O are detected in addition to Cd, Se, and S elements as illustrated in FIG. 5. Thus, it is apparent that the coated nano particle of the Embodiment 2 has silica as a coating material in addition to the compound semiconductor material.

The coated nano particle of the present invention can provide an illuminator having a luminous efficiency by controlling the scattering amount of the light emitted from a light source, reducing the reflection of the light produced from the nano particle, and effectively transferring the light to the outside. Further, an electronic device using the nano particle as an illuminator provides a means for improving luminous efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A matrix dispersed coated nanoparticle, comprising:
   a nanoparticle, which receives and emits light;
   a coating material formed on a surface of the nanoparticle, the coating material having an index of refraction which is less than an index of refraction of the nanoparticle; and
   a matrix disposed on the coating material,
   wherein the index of refraction of the coating material is greater than an index of refraction of the matrix.

2. The matrix dispersed coated nanoparticle of claim 1, wherein the coating material is formed on a surface of the nanoparticle with a multi-layered structure, and an index of refraction of a first layer of the multi-layered structure is greater than an index of refraction of a second layer thereof.

3. The coated nanoparticle of claim 2, wherein the first layer is an inner layer the second layer is an outer layer.

4. The coated nanoparticle of claim 1, wherein an index of refraction of the coating material is lower than an index of refraction of the nanoparticle.

5. The matrix dispersed coated nanoparticle of claim 1, wherein the nanoparticle is selected from a group II-VI compound, a group III-V compound, a group IV-VI compound, a group IV compound, or a mixture thereof.

6. The matrix dispersed coated nanoparticle of claim 5, wherein the group II-VI compound is selected from the group consisting of a two-element compound comprising CdSe, CdTe, ZnS, ZnSe, ZnTe, ZnO, HgS, HgSe, or HgTe; a three-element compound comprising CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnTe, or HgZnSe; and a four-element compound comprising CdZnSeS, CdZnSeTe, CdZnSTe, CdHgSeS, CdHgSeTe, CdHgSTe, HgZnSeS, HgZnSeTe, or HgZnSTe;

the group III-V compound is selected from the group consisting of a two-element compound comprising GaN, Gap, GaAs, GaSb, AlN, AlP, AlAs, AlSb, InN, InP, InAs, or InSb; a three-element compound comprising GaNP, GaNAs, GaNSb, GaPAs, GaPSb, AlNP, AlNAs, AlNSb, AlPAs, AlPSb, InNP, InNAs, InNSb, InPAs, InPSb, or GaAlNP; and a four-element compound comprising GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, or InAlPSb;

the group IV-VI compound is selected from the group consisting of a two-element compound comprising SnS, SnSe, SnTe, PbS, PbSe, or PbTe; a three-element compound comprising SnSeS, SnSeTe, SnSTe, PbSeS, PbSeTe, PbSTe, SnPbS, SnPbSe, or SnPbTe; and a four-element compound comprising SnPbSSe, SnPbSeTe, or SnPbSTe; and the group IV compound is selected from the group consisting of a single element compound comprising Si or Ge; and a two-element compound comprising SiC or SiGe.

7. The matrix dispersed coated nanoparticle of claim 6, wherein the two-element compound, the three-element compound, or the four-element compound exist inside the nanoparticle.

8. The matrix dispersed coated nanoparticle of claim 1, wherein the nanoparticle further comprises an inorganic fluorescent material.

9. The matrix dispersed coated nanoparticle of claim 8, wherein the inorganic fluorescent material is composed of at least one selected from the group consisting of $YBO_3:Ce^{3+}$, $Tb^{3+}$; $BaMgAl_{10}O_{17}:Eu^{2+}$, $Mn^{2+}$; $(Sr, Ca,Ba)(Al,Ga)_2S_4:Eu^{2+}$; ZnS:Cu,Al; $Ca_8Mg(SiO_4)_4Cl_2:Eu^{2+}$, $Mn^{2+}$; $Ba_2SiO_4:Eu^{2+}$; $(Ba,Sr)_2SiO_4:Eu^{2+}$; $Ba_2(Mg,Zn)Si_2O_7:Eu^{2+}$; $(Ba,Sr)Al_2O_4:Eu^{2+}$; $Sr_2Si_3O_{8.2}SrCl_2:Eu^{2+}$; $(Sr,Mg,Ca)_{10}(PO_4)_6Cl_2:Eu^{2+}$; $BaMgAl_{10}O_{17}:Eu^{2+}$; $BaMg_2Al_{16}O_{27}:Eu^{2+}$; $(Sr, Ca,Ba, Mg)P_2O_7:Eu^{2+}$, $Mn^2+$; $CaLa_2S_4:Ce^{3+}$; $SrY_2S_4:Eu^{2+}$; $(Ca,Sr)S:Eu^{2+}$; $SrS:Eu^{2+}$; $Y_2O_3:Eu^{3+}$, $Bi^{3+}$; $YVO_4:Eu^{3+}$, $Bi^{3+}$; $Y_2O_2S:Eu^{3+}$, $Bi^{3+}$; and $Y_2O_2S:Eu^{3+}$.

10. The matrix dispersed coated nanoparticle of claim 1, wherein the coating material is selected from the group consisting of $SiO_2$, $TiO_2$, $SnO_2$, ZnO, ZnS, an $In_2O_3$—$SnO_2$ composite, and $Al_2O_3$, and a mixture thereof.

11. The matrix dispersed coated nanoparticle of claim 1, wherein light allowing the nanoparticle to emit has a wavelength of approximately 400 to 2400 nm.

12. An electronic device comprising a matrix dispersed coated nanoparticle as an illuminator, the matrix dispersed coated nanoparticle comprising:
a nanoparticle, which receives and emits light;
a coating material formed on a surface of the nanoparticle, the coating material having an index of refraction which is less than an index of refraction of the nanoparticle; and
a matrix disposed on the coating material,
wherein the index of refraction of the coating material is greater than an index of refraction of the matrix.

13. The electronic device of claim 12, wherein the coating material is formed on a surface of the nanoparticle with a multi-layered structure, and an index of refraction of a lower portion in the multi-layered structure is greater than an index of refraction of an upper portion thereof.

14. The electronic device of claim 12, wherein a difference of indexes of refraction between the coating material and the nanoparticle is 0.05 or more.

15. The electronic device of claim 12, wherein the nanoparticle is selected from a group II-VI compound, a group III-V compound, a group IV-VI compound, a group IV compound, or a mixture thereof.

16. The electronic device of claim 15, wherein the group II-VI compound is selected from the group consisting of a two-element compound comprising CdSe, CdTe, ZnS, ZnSe, ZnTe, ZnO, HgS, HgSe, or HgTe; a three-element compound comprising CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnTe, or HgZnSe; and a four-element compound such as CdZnSeS, CdZnSeTe, CdZnSTe, CdHgSeS, CdHgSeTe, CdHgSTe, HgZnSeS, HgZnSeTe, or HgZnSTe;

the group III-V compound is selected from the group consisting of a two-element compound comprising GaN, GaP, GaAs, GaSb, AlN, AlP, AlAs, AlSb, InN, InP, InAs, or InSb; a three-element compound comprising GaNP, GaNAs, GaNSb, GaPAs, GaPSb, AlNP, AlNAs, AlNSb, AlPAs, AlPSb, InNP, InNAs, InNSb, InPAs, InPSb, or GaAlNP; and a four-element compound comprising GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, or InAlPSb;

the group IV-VI compound is selected from the group consisting of a two-element compound comprising SnS, SnSe, SnTe, PbS, PbSe, or PbTe; a three-element compound comprising SnSeS, SnSeTe, SnSTe, PbSeS, PbSeTe, PbSTe, SnPbS, SnPbSe, or SnPbTe; and a four-element compound comprising SnPbSSe, SnPbSeTe, or SnPbSTe; and the group IV compound is selected from the group consisting of a single element compound comprising Si or Ge; and a two-element compound comprising SiC or SiGe.

17. The electronic device of claim 16, wherein the two-element compound, the three-element compound, or the four-element compound exist inside a particle with a constant concentration, or exist inside a same particle with divided into different states in concentration.

18. The electronic device of claim 12, wherein the nanoparticle is selected from the group consisting of inorganic fluorescent materials or a mixture thereof.

19. The electronic device of claim 18, wherein the inorganic fluorescent material is composed of at least one selected from the group consisting of $YBO_3:Ce^{3+}$, $Tb^{3+}$; $BaMgAl_{10}O_{17}:Eu^{2+}$, $Mn^{2+}$; $(Sr, Ca,Ba)(Al,Ga)_2S_4:Eu^{2+}$;

ZnS:Cu,Al; Ca$_8$Mg(SiO$_4$)$_4$Cl$_2$:Eu$^{2+}$,Mn$^{2+}$; Ba$_2$SiO$_4$:Eu$^{2+}$; (Ba,Sr)$_2$SiO$_4$:Eu$^{2+}$; Ba$_2$(Mg,Zn)Si$_2$O$_7$:Eu$^{2+}$; (Ba,Sr)Al$_2$O$_4$:Eu$^{2+}$; Sr$_2$Si$_3$O$_{8.2}$SrCl$_2$:Eu$^{2+}$; (Sr,Mg,Ca)$_{10}$(PO$_4$)$_6$Cl$_2$:Eu$^{2+}$; BaMgAl$_{10}$O$_{17}$:Eu$^{2+}$; BaMg$_2$Al$_{16}$O$_{27}$:Eu$^{2+}$; Sr, Ca,Ba,Mg) P$_2$O$_7$:Eu$^{2+}$, Mn$^{2+}$; CaLa$_2$S$_4$:Ce$^{3+}$; SrY$_2$S$_4$:Eu$^{2+}$; (Ca,Sr)S: Eu$^{2+}$; SrS:Eu$^{2+}$; Y$_2$O$_3$:Eu$^{3+}$, Bi$^{3+}$; YVO$_4$:Eu$^{3+}$, Bi$^{3+}$;Y$_2$O$_2$S: Eu$^{3+}$, Bi$^{3+}$; and Y$_2$O$_2$S:Eu$^{3+}$.

20. The electronic device of claim 12, wherein the coating material is selected from the group consisting of SiO$_2$, TiO$_2$, SnO$_2$, ZnO, ZnS, In$_2$O$_3$—SnO$_2$, and Al$_2$O$_3$, or a mixture thereof.

21. The electronic device of claim 12, wherein the electronic device is one among a light emitting diode, a laser diode, an LCD, or a PDP.

22. The electronic device of claim 12, wherein the electronic device further comprises:
a light source emitting light on to the matrix.

23. The electronic device of claim 22, wherein the light source emits light having a wavelength of approximately 400 to 2400 nm.

24. The electronic device of claim 22, wherein a difference of indexes of refraction between the matrix and the coating material of the composite nanoparticle is 0.05 or more.

25. The electronic device of claim 22, wherein the matrix is selected from the group consisting of epoxy, silicon, acrylate polymer, glass, carbonate polymer, and a mixture thereof.

26. A matrix dispersed coated nanoparticle comprising:
a nanoparticle;
a coating material formed on a surface of the nanoparticle, the coating material enclosing the nanoparticle to form a coated nanoparticle; and
a matrix, the matrix enclosing the coated nanoparticle,
wherein a difference of an index of refraction of the coating material and an index of refraction of the nanoparticle is 0.05 to 2, and a difference of the index of refraction of the coating material and an index of refraction of the matrix is equal to or greater than 0.05, and wherein the index of refraction of the coating material is greater than an index of refraction of the matrix.

* * * * *